United States Patent
Sivakumar et al.

(10) Patent No.: US 11,551,088 B2
(45) Date of Patent: Jan. 10, 2023

(54) DETERMINING OPTIMAL AUGMENTATIONS FOR A TRAINING DATA SET

(71) Applicant: International Business Machines Corporation, Armonk, NY (US)

(72) Inventors: Gandhi Sivakumar, Bentleigh (AU); Vijay Ekambaram, Chennai (IN); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 16/818,891

(22) Filed: Mar. 13, 2020

(65) Prior Publication Data

US 2021/0287084 A1    Sep. 16, 2021

(51) Int. Cl.
| | | |
|---|---|---|
| G06N 3/08 | (2006.01) | |
| G06N 5/00 | (2006.01) | |
| G06N 20/00 | (2019.01) | |
| G06N 3/04 | (2006.01) | |
| G06N 3/02 | (2006.01) | |
| G06Q 10/06 | (2012.01) | |

(52) U.S. Cl.
CPC ............ *G06N 3/08* (2013.01); *G06N 3/02* (2013.01); *G06N 3/04* (2013.01); *G06N 20/00* (2019.01); *G06Q 10/0631* (2013.01)

(58) Field of Classification Search
CPC ........... G06N 3/08; G06N 20/00; G06N 3/02; G06N 3/04; G06Q 10/0631
USPC .......................................................... 706/25
See application file for complete search history.

(56) References Cited

U.S. PATENT DOCUMENTS

| | | | | |
|---|---|---|---|---|
| 11,227,187 | B1* | 1/2022 | Weinberger | G06N 3/04 |
| 2016/0034809 | A1* | 2/2016 | Trenholm | G06N 3/02 |
| | | | | 706/20 |
| 2019/0325275 | A1* | 10/2019 | Lee | G06V 20/41 |
| 2019/0354895 | A1 | 11/2019 | Vasudevan et al. | |
| 2020/0349466 | A1* | 11/2020 | Hoogerwerf | G06N 20/00 |
| 2020/0387760 | A1* | 12/2020 | Kamdar | G06K 9/6257 |
| 2020/0410356 | A1* | 12/2020 | Kuo | G06K 9/6227 |

(Continued)

OTHER PUBLICATIONS

Cubuk et al., "AutoAugment: Learning Augmentation Strategies from Data," arXiv, Apr. 11, 2019, 14 pages, retrieved from https://arxiv.org/pdf/1805.09501.pdf.

(Continued)

*Primary Examiner* — Ly D Pham
(74) *Attorney, Agent, or Firm* — Zilka-Kotab, P.C.

(57) ABSTRACT

A computer-implemented method according to one embodiment includes receiving a training data set to be applied to a model; selecting a subset of the training data set as a sample set; for each of a plurality of predetermined augmentations, applying the predetermined augmentation to the sample set to create an augmented sample set, training the model with the augmented sample set, determining a performance of the trained model, and assigning a weight to the predetermined augmentation for the training data set, based on the determined performance; and selecting one or more of the plurality of predetermined augmentations to be applied to the training data set before the training data set is applied to the model, based on the weight assigned to each of the plurality of predetermined augmentations.

20 Claims, 10 Drawing Sheets

(56) References Cited

U.S. PATENT DOCUMENTS

2021/0064639 A1* 3/2021 Wang .................... G06F 16/285
2021/0232980 A1* 7/2021 Velagapudi ............ G06K 9/623

OTHER PUBLICATIONS

Lemley et al., "Smart Augmentation Learning an Optimal Data Augmentation Strategy," IEEE Access, vol. 5, Apr. 2017, pp. 5858-5869.

Anonymous, "Task-aware data augmentation for Natural Language Processing," IP.com Prior Art Database, Technical Disclosure No. IPCOM000258931D, Jun. 27, 2019, 6 pages.

Van Der Valk et al., "Bias-variance Decomposition in Machine Learning-based Side-channel Analysis," IACR Cryptology ePrint Archive, 2019, 27 pages, retrieved from https://eprint.iacr.org/2019/570pdf.

Neal et al., "A Modern Take on the Bias-Variance Tradeoff in Neural Networks," arXiv preprint, Jul. 2019, pp. 1-27.

Anonymous, "Nist Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

Cai, E., "Machine Learning Lesson of the Day—Overfitting and Underfitting," The Chemical Statistician, Mar. 19, 2014, 3 pages, retrieved from https://chemicalstatistician.wordpress.com/2014/03/19/machine-learning-lesson-of-the-day-overfitting-and-underfitting/.

Elite Data Science, "Overfitting in Machine Learning: What It Is and How to Prevent It," Elite Data Science, 2019, 12 pages, retrieved from https://elitedatascience.com/overfilling-in-machine-learning.

Despois, J., "Memorizing is not learning!—6 tricks to prevent overfitting in machine learning," Hackernoon, Mar. 20, 2018, 17 pages, retrieved from https://hackernoon.com/memorizing-is-not-learning-6-tricks-to-prevent-overfitting-in-machine-learning-820b091dc42.

Poyiatzis, A., "NLP: Contextualized word embeddings from BERT," Medium, towards data science, Mar. 19, 2019, pages, retrieved from https://towardsdatascience.com/nlp-extract-contextualized-word-embeddings-from-bert-keras-tf-67ef29f60a7b.

Appalaraju et al., "Image similarity using Deep CNN and Curriculum Learning," GHCI 17 Oral talk in Artificial Intelligence, Data mining and Machine learning track, 2017, pp. 1-9.

Brownlee, J., "How to Reduce Variance in a Final Machine Learning Model," Machine Learning Mastery, Aug. 19, 2018, 16 pages, retrieved from https://machinelearningmastery.com/how-to-reduce-model-variance/.

Sivakumar et al., U.S. Appl. No. 17/944,387, filed Sep. 14, 2022.

\* cited by examiner

DETERMINING OPTIMAL AUGMENTATIONS FOR A TRAINING DATA SET

BACKGROUND

The present invention relates to machine learning, and more particularly, this invention relates to augmenting training data for machine learning models.

Machine learning models are often used to perform tasks such as classification, identification, etc. Such models need to be trained before they are implemented; however, an inadequate quality and/or quantity of training data may result in overfitting or underfitting of such training data to a model, which may negatively impact a performance of the trained model.

BRIEF SUMMARY

A computer-implemented method according to one embodiment includes receiving a training data set to be applied to a model; selecting a subset of the training data set as a sample set; for each of a plurality of predetermined augmentations, applying the predetermined augmentation to the sample set to create an augmented sample set, training the model with the augmented sample set, determining a performance of the trained model, and assigning a weight to the predetermined augmentation for the training data set, based on the determined performance; and selecting one or more of the plurality of predetermined augmentations to be applied to the training data set before the training data set is applied to the model, based on the weight assigned to each of the plurality of predetermined augmentations.

According to another embodiment, a computer program product for determining optimal augmentations for a training data set includes a computer readable storage medium having program instructions embodied therewith, where the computer readable storage medium is not a transitory signal per se, and where the program instructions are executable by a processor to cause the processor to perform a method including receiving, by the processor, a training data set to be applied to a model; selecting, by the processor, a subset of the training data set as a sample set; for each of a plurality of predetermined augmentations, applying, by the processor, the predetermined augmentation to the sample set to create an augmented sample set, training, by the processor, the model with the augmented sample set, determining, by the processor, a performance of the trained model, and assigning, by the processor, a weight to the predetermined augmentation for the training data set, based on the determined performance; and selecting, by the processor, one or more of the plurality of predetermined augmentations to be applied to the training data set before the training data set is applied to the model, based on the weight assigned to each of the plurality of predetermined augmentations.

According to another embodiment, a system includes a processor; and logic integrated with the processor, executable by the processor, or integrated with and executable by the processor, where the logic is configured to receive a training data set to be applied to a model; select a subset of the training data set as a sample set; for each of a plurality of predetermined augmentations, apply the predetermined augmentation to the sample set to create an augmented sample set, train the model with the augmented sample set, determine a performance of the trained model, and assign a weight to the predetermined augmentation for the training data set, based on the determined performance; and select one or more of the plurality of predetermined augmentations to be applied to the training data set before the training data set is applied to the model, based on the weight assigned to each of the plurality of predetermined augmentations.

Other aspects and embodiments of the present invention will become apparent from the following detailed description, which, when taken in conjunction with the drawings, illustrate by way of example the principles of the invention.

DETAILED DESCRIPTION

Figure 1:
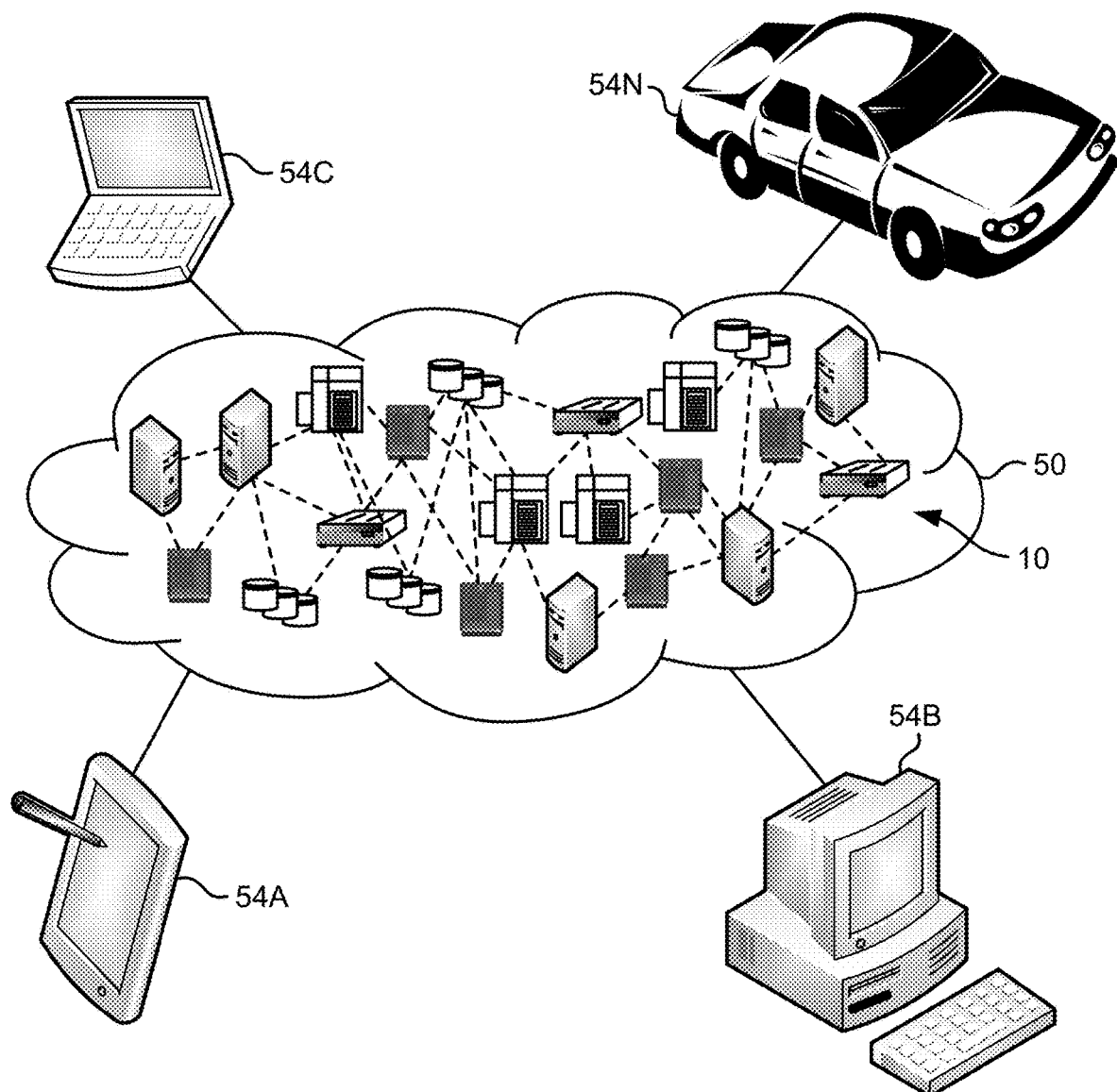
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of determining optimal augmentations for a training data set.

In one general embodiment, a computer-implemented method includes receiving a training data set to be applied to a model; selecting a subset of the training data set as a sample set; for each of a plurality of predetermined augmentations, applying the predetermined augmentation to the sample set to create an augmented sample set, training the model with the augmented sample set, determining a performance of the trained model, and assigning a weight to the predetermined augmentation for the training data set, based on the determined performance; and selecting one or more of the plurality of predetermined augmentations to be applied to the training data set before the training data set is applied to the model, based on the weight assigned to each of the plurality of predetermined augmentations.

In another general embodiment, a computer program product for determining optimal augmentations for a training data set includes a computer readable storage medium having program instructions embodied therewith, where the computer readable storage medium is not a transitory signal per se, and where the program instructions are executable by a processor to cause the processor to perform a method including receiving, by the processor, a training data set to be applied to a model; selecting, by the processor, a subset of the training data set as a sample set; for each of a plurality of predetermined augmentations, applying, by the processor, the predetermined augmentation to the sample set to create an augmented sample set, training, by the processor, the model with the augmented sample set, determining, by the processor, a performance of the trained model, and assigning, by the processor, a weight to the predetermined augmentation for the training data set, based on the determined performance; and selecting, by the processor, one or more of the plurality of predetermined augmentations to be applied to the training data set before the training data set is applied to the model, based on the weight assigned to each of the plurality of predetermined augmentations.

In another general embodiment, a system includes a processor; and logic integrated with the processor, executable by the processor, or integrated with and executable by the processor, where the logic is configured to receive a training data set to be applied to a model; select a subset of the training data set as a sample set; for each of a plurality of predetermined augmentations, apply the predetermined augmentation to the sample set to create an augmented sample set, train the model with the augmented sample set, determine a performance of the trained model, and assign a weight to the predetermined augmentation for the training data set, based on the determined performance; and select one or more of the plurality of predetermined augmentations to be applied to the training data set before the training data set is applied to the model, based on the weight assigned to each of the plurality of predetermined augmentations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
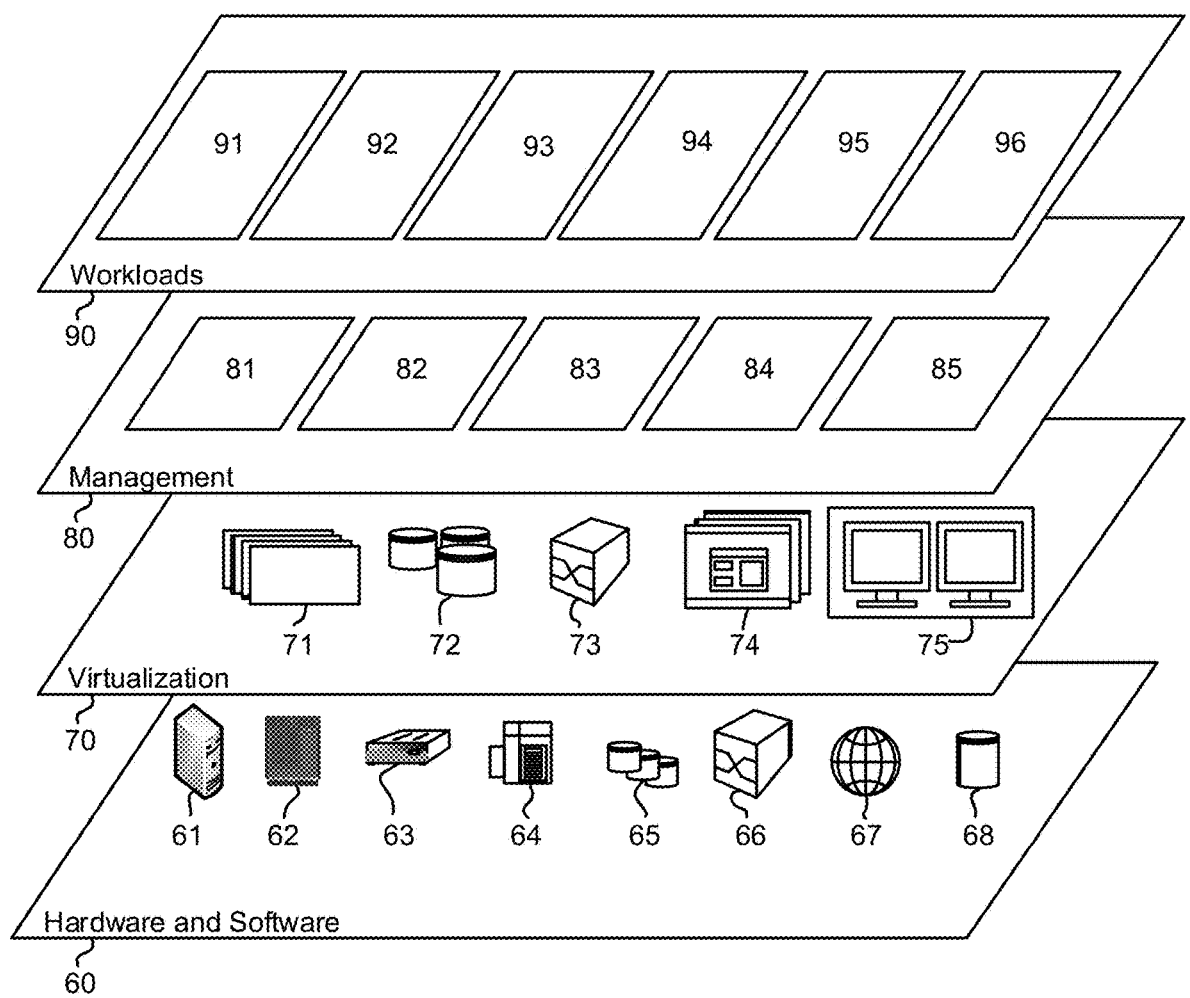
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data augmentation analysis 96.

Figure 3:
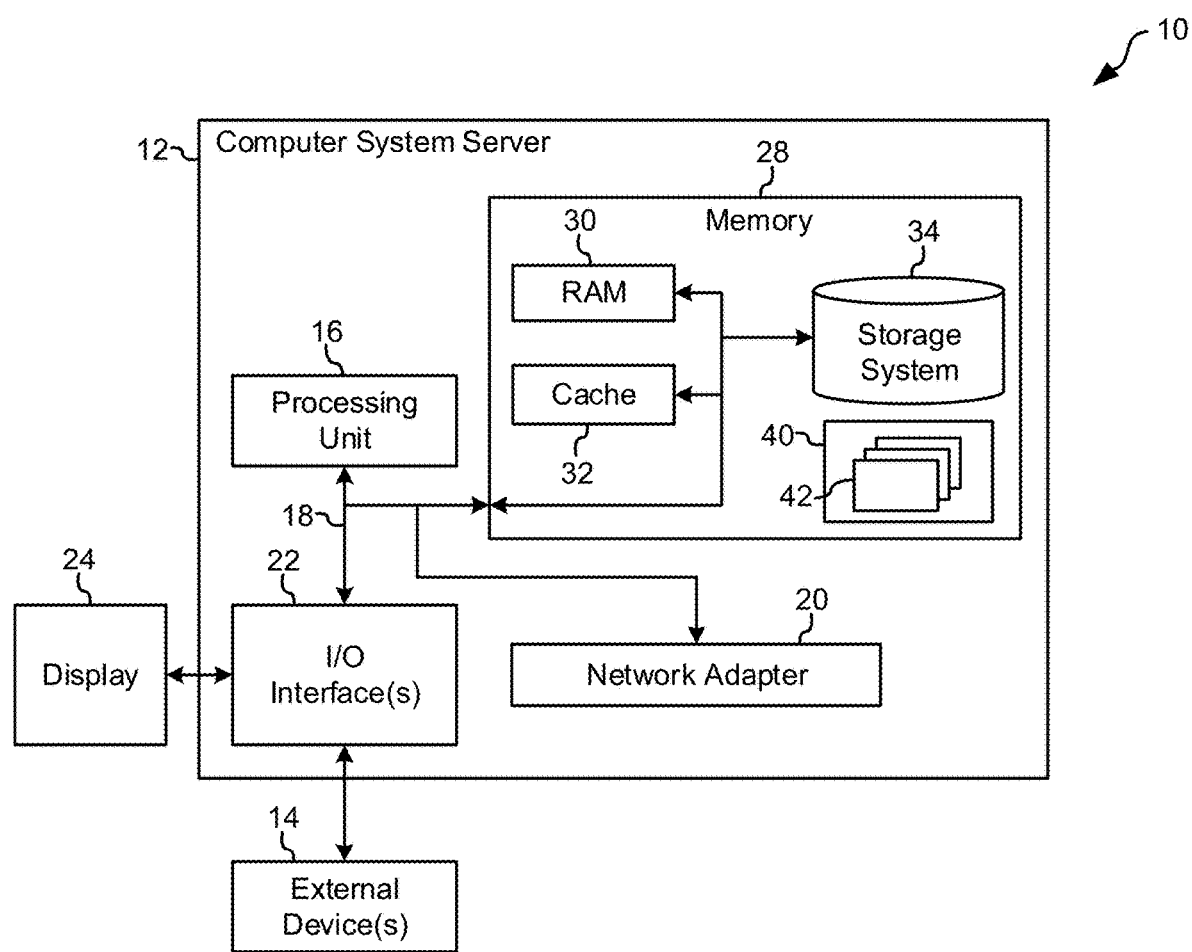
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
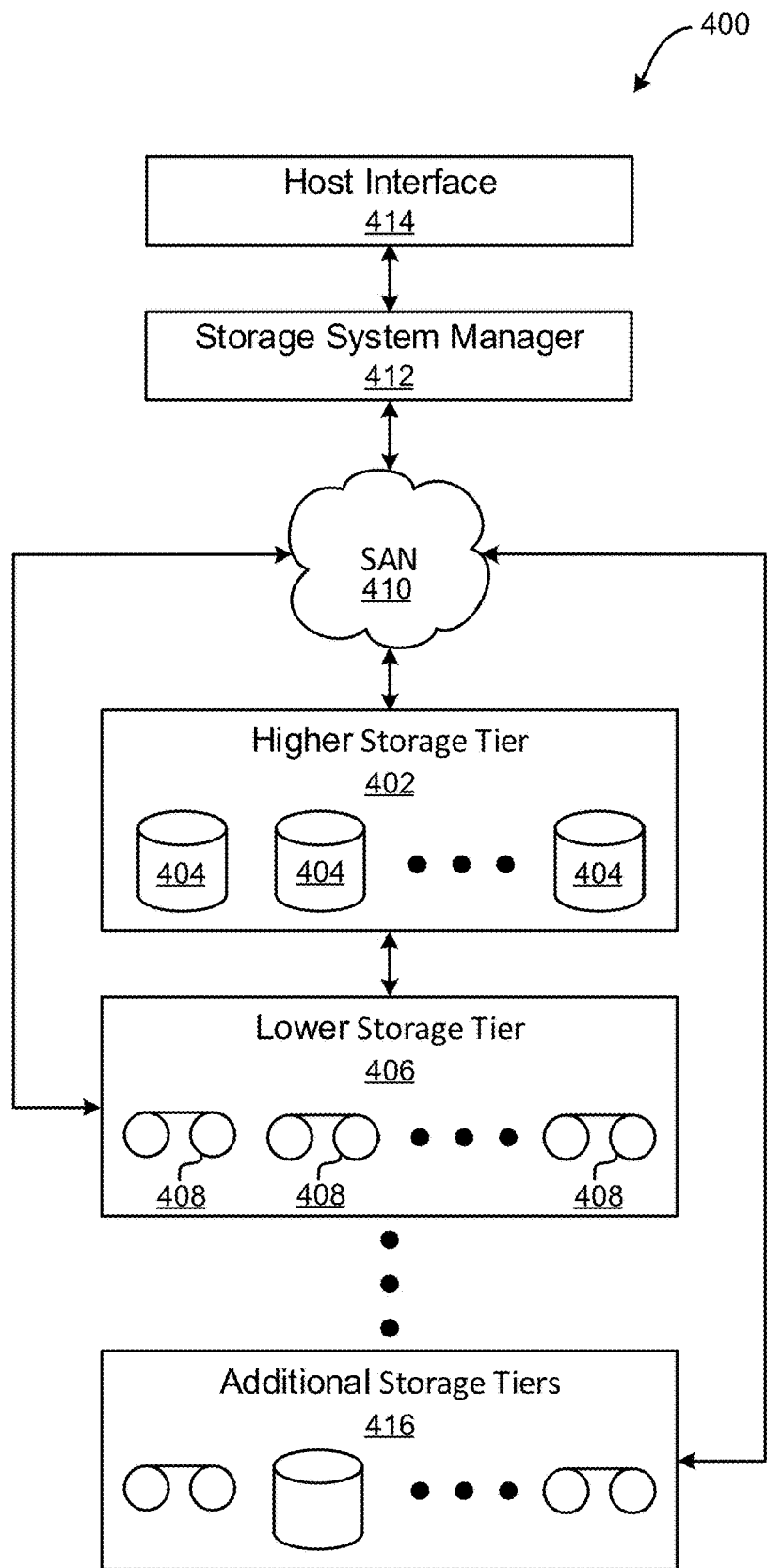
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
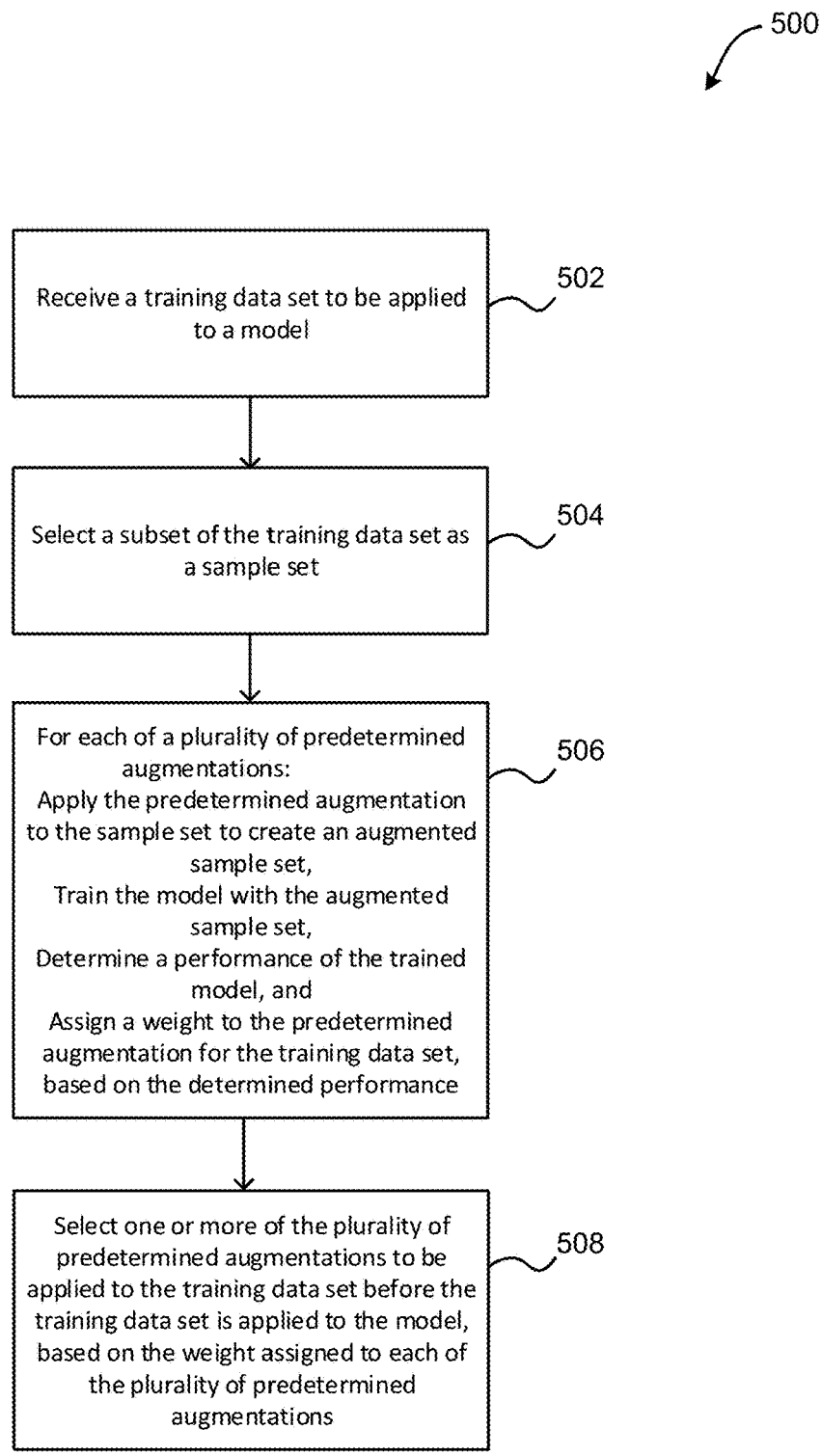
FIG. 5 illustrates a flowchart of a method for determining optimal augmentations for a training data set, in accordance with one embodiment of the present invention.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a training data set to be applied to a model is received. In one embodiment, the training data set may include data used to train the model to perform one or more operations. In another embodiment, the training data may include a plurality of instances of data (e.g., images, text, video, etc.), as well as an identification of one or more entities within the data (e.g., an identification of one or more objects within the images, one or more ground truth labels, etc.).

Additionally, in one embodiment, the model may include a machine learning model (e.g., a neural network, etc.). For example, the model may perform one or more operations (e.g., classification, identification, etc.). In another embodiment, training data set may be received from a computing device (e.g., a server), one or more data storage locations (e.g., one or more databases), etc.

Further, method 500 may proceed with operation 504, where a subset of the training data set is selected as a sample set. In one embodiment, selecting the subset of the training data set may include identifying a predetermined percentage of the training data set as the sample set. In another embodiment, the subset may be selected randomly from the training data set. In yet another embodiment, the subset may be selected from the training data set according to one or more selection algorithms.

Further still, method 500 may proceed with operation 506, where for each of a plurality of predetermined augmentations, the predetermined augmentation is applied to the sample set to create an augmented sample set, the model is trained with the augmented sample set, a performance of the trained model is determined, and a weight is assigned to the predetermined augmentation for the training data set, based on the determined performance. In one embodiment, each of the plurality of predetermined augmentations may include a process (e.g., an application, etc.) that changes one or more aspects of each data instance within the training data set to create an augmented data set. For example, using an image as an example of a data instance within the sample set, the one or more aspects may include an orientation of one or more objects within the image, a positioning of one or more objects within the image, a size of one or more objects within the image, a shading of the image, an amount of noise present in the image, a perspective of the image, etc.

For example, a first augmentation may include a random rotation of an input data image. For instance, given the sample set as input (where each data instance within the sample set is an image), the first augmentation may rotate each of the images within the sample set in a random direction, and may save the rotated images as the augmented sample set for the first augmentation. In another example, a second augmentation may include an addition of noise to an input data image. For instance, given the sample set as input (where each data instance within the sample set is an image), the second augmentation may add a predetermined amount of noise to each of the images within the sample set, and may save the altered images as the augmented sample set for the second augmentation.

Also, in one embodiment, each of the plurality of predetermined augmentations may be associated with a predetermined level of randomness. In another embodiment, the plurality of predetermined augmentations may be applied to the sample set by automatically forking a large varied set of virtual training instances in a cloud environment to validate which of the plurality of predetermined augmentations has a highest performance for the sample set.

In addition, in one embodiment, for each of the predetermined augmentations, the created augmented sample set may be input to the model as training data. In another embodiment, the model may be trained to perform one or more duties (e.g., image classification, etc.), based on the training data.

Furthermore, in one embodiment, another instance of the model may be trained using a non-augmented sample set (e.g., a sample set without any augmentation). In another embodiment, additional data other than the subset of the training data set (e.g., a set of data different from the training data set, etc.) may be provided as input to both the model trained with the augmented sample set and the other instance of the model trained with the non-augmented sample set.

Further still, in one embodiment, each instance of the additional data may have an associated label (e.g., an authenticated label provided by one or more human users). In another embodiment, a first output of the model trained with the augmented sample set may be determined. In yet another embodiment, a second output of the other instance of the model trained with the non-augmented sample set may be determined.

Also, in one embodiment, the first output and the second output may be compared to labels associated with the additional data to determine an accuracy of the first output and an accuracy of the second output. For example, the accuracy may be associated with a validation loss for the trained model. In another example, a first trained model with a lower validation loss than a second trained model may have a higher accuracy than the second trained model.

Additionally, in one embodiment, the weight assigned to the predetermined augmentation for the training data set may be determined based on the comparison of the first output to the second output. For example, a value of the weight may be proportional to an improvement of an accuracy of the first output (associated with the model trained with the augmented sample set) over an accuracy of the second output (associated with the model trained with the non-augmented sample set). In another example, if a first improvement in accuracy (associated with a first augmentation) is greater than a second improvement in accuracy (associated with a second augmentation), the first augmentation may me assigned a greater weight than the second augmentation.

Further, in one embodiment, the weight may be assigned to a grouping of the predetermined augmentation, the training data set, and the model. For example, the weight may be stored, and may be linked to both the predetermined augmentation, the training data set, and the model.

Further still, in one embodiment, a plurality of individual training instances may be constructed to determine weights for the plurality of predetermined augmentations. For example, the plurality of training instances may be created within a processing environment (e.g., a distributed processing environment, a cloud computing environment) utilizing one or more forking operations. In another example, each of a plurality of forked training instances may select a unique predetermined augmentation from the plurality of predetermined augmentations. In yet another example, each of a plurality of forked training instances may augment the sample set, train the model, determine performance, and assign a weight to the predetermined augmentation. In still another example, each of a plurality of forked training instances may operate in parallel.

Also, method 500 may proceed with operation 508, where one or more of the plurality of predetermined augmentations are selected to be applied to the training data set before the training data set is applied to the model, based on the weight assigned to each of the plurality of predetermined augmentations. In one embodiment, plurality of predetermined augmentations may be ranked based on their associated weights.

In addition, in one embodiment, a predetermined number of augmentations having the highest weights may be selected to be applied to the training data set before the training data set is applied to the model. In another embodiment, the selected augmentations may be applied to the training data set to create an augmented training data set. In yet another embodiment, the augmented training data set may be input into the model to train the model to perform one or more operations (e.g., classification, identification, etc.).

Furthermore, in one embodiment, one or more operations may then be performed by the trained model. For example, data may be input into the trained model, and the model may perform one or more operations (e.g., classification, identification, etc.) on the input data to create output data (e.g., a confidence score, a classification, an identification, etc.).

In this way, one or more augmentations may be determined for a training data set that increase a performance and accuracy of a trained machine learning model implemented utilizing a hardware computing device. Further, multiple augmentations may be implemented and examined in parallel, which may improve a performance of a computing device comparing the augmentations.

Figure 6:
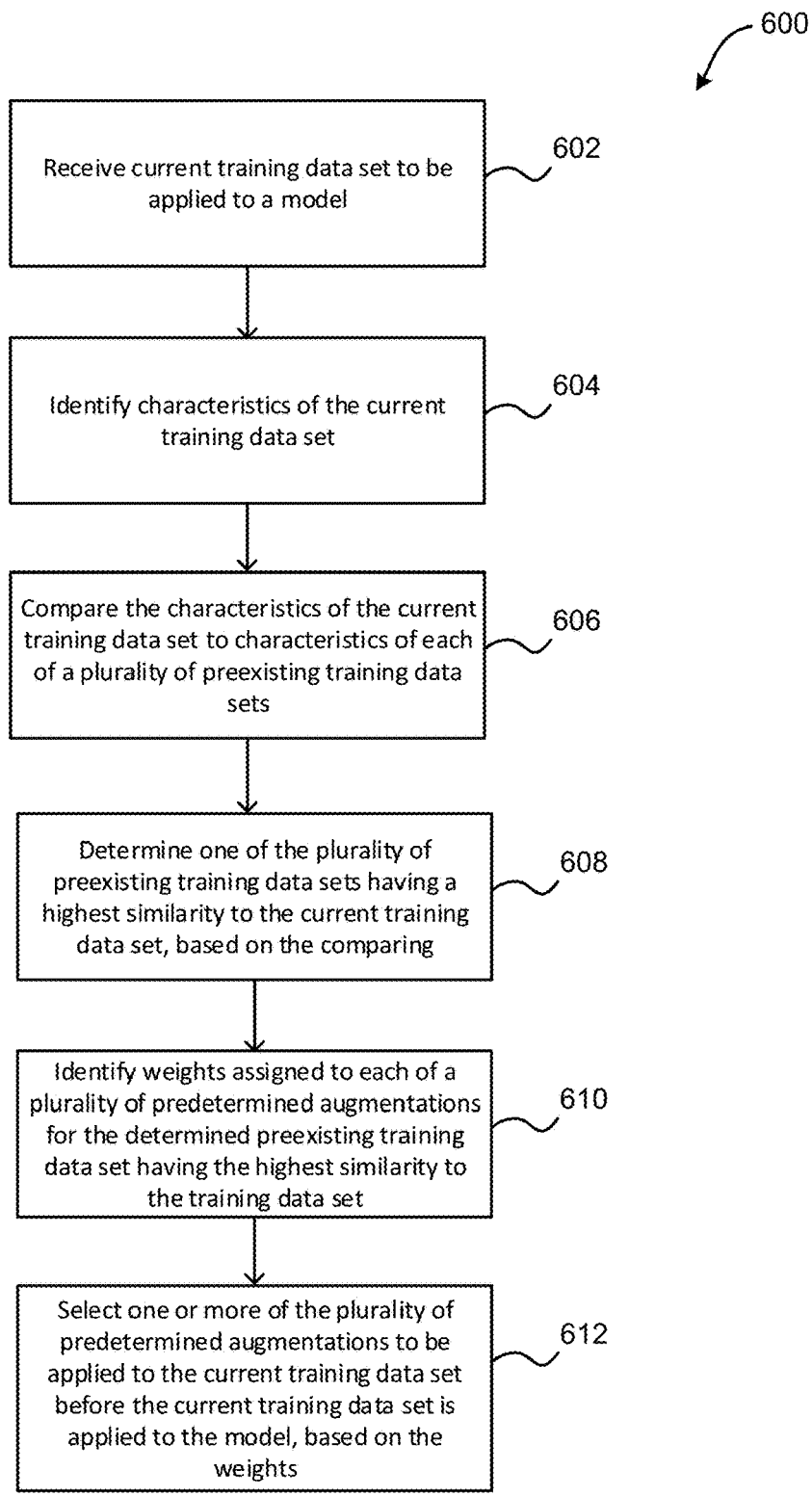
FIG. 6 illustrates a flowchart of a method for identifying predetermined optimal augmentations for a training data set, in accordance with one embodiment of the present invention.

Now referring to FIG. 6, a flowchart of a method 600 for identifying predetermined optimal augmentations for a training data set is shown according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a current training data set to be applied to a model is received. In one embodiment, the current training data set may include data used to train the model to perform one or more operations. In another embodiment, the training data may include a plurality of instances of data (e.g., images, text, video, etc.), as well as an identification of one or more entities within the data (e.g., an identification of one or more objects within the images, one or more ground truth labels, etc.).

Additionally, in one embodiment, the model may include a machine learning model (e.g., a neural network, etc.). In another embodiment, model may perform one or more operations (e.g., classification, identification, etc.). In still another embodiment, the current training data set may be received from a computing device (e.g., a server), one or more data storage locations (e.g., one or more databases), etc.

Further, method 600 may proceed with operation 604, where characteristics of the current training data set are identified. In one embodiment, the characteristics of the current training data set may include an embedding of the training data set. In another embodiment, the current training data set may be converted into an embedding using one or more embedding techniques (e.g., convolutional neural network (CNN) embedding, bidirectional encoder representations from transformers (BERT) embedding, etc.).

Further still, in one embodiment, the embedding of the current training data set may include an N-dimensional vector created from the current training data set. In another embodiment, the embedding may be stored in an annoy index (e.g., a database for storing embedding representations, etc.).

Also, method 600 may proceed with operation 606, where the characteristics of the current training data set are compared to characteristics of each of a plurality of preexisting training data sets. In one embodiment, each of the plurality of preexisting training data sets may be converted into preexisting embedding representations. In another embodiment, each of these preexisting embedding representations may be compared to the embedding of the current training data set.

In addition, in one embodiment, comparing embedding representations may include computing a cosine distance for each pair of data across two data sets. For example, these cosine distance values may be aggregated to determine a total score for the two data sets. In another embodiment, an aggregated cosine distance score may be individually computed for the current training data set and each of the plurality of preexisting training data sets.

Furthermore, method 600 may proceed with operation 608, where one of the plurality of preexisting training data sets having a highest similarity to the current training data set is determined, based on the comparing. In one embodiment, the aggregated cosine distance scores for the current training data set and each of the plurality of preexisting training data sets may be compared. In another embodiment, the one of the plurality of preexisting training data sets having the lowest aggregated cosine distance score with the current training data set may be determined to have the highest similarity to the current training data set.

Further still, method 600 may proceed with operation 610, where weights assigned to each of a plurality of predetermined augmentations for the determined preexisting training data set having the highest similarity to the training data set are identified. In one embodiment, each of a plurality of predetermined augmentations may be individually grouped with the determined preexisting training data set having the highest similarity to the training data set (as well as the model). In another embodiment, each of these groupings may have an associated weight (e.g., based on an effect created by training the model with the determined preexisting training data having the predetermined augmentation).

Also, method 600 may proceed with operation 612, where one or more of the plurality of predetermined augmentations are selected to be applied to the current training data set before the current training data set is applied to the model, based on the weights. In one embodiment, the grouping with the highest weight may be selected for application. In another embodiment, the predetermined augmentation associated with the selected grouping may be applied to the training data set to create an augmented training data set. In yet another embodiment, the model may be trained, utilizing the augmented training data set. In still another embodiment, one or more operations may then be performed by the trained model.

In this way, by comparing characteristics of a current data set to existing training data sets instead of individually testing augmentations on the current data set, optimal augmentations may be determined for the current data set in an expedited manner, using fewer computing resources, which may improve a performance of a system determining such optimal augmentations.

Discovering an Optimal Augmentation Matrix for Improved Bias-Variance Trade-Off in Classifiers Overfitting occurs when a statistical model or machine learning algorithm captures the noise of the data. Intuitively, overfitting occurs when the model or the algorithm fits the data too well. Specifically, overfitting occurs if the model or algorithm shows low bias but high variance. Overfitting is often a result of an excessively complicated model, and it can be prevented by fitting multiple models and using validation or cross-validation to compare their predictive accuracies on test data.

Underfitting occurs when a statistical model or machine learning algorithm cannot capture the underlying trend of the data. Intuitively, underfitting occurs when the model or the algorithm does not fit the data well enough. Specifically, underfitting occurs if the model or algorithm shows low variance but high bias. Underfitting is often a result of an excessively simple model. Both overfitting and underfitting lead to poor predictions on new data sets.

Collecting more data is a time-consuming and expensive process. One alternative to collecting additional raw data is altering data to make it appear as if it was more diverse. For example, data augmentation techniques may be used so that each time a sample is processed by a model, it is slightly different from the previous sample. This will make it harder for the model to learn parameters for each sample.

Another good practice is to add noise to the input or to the output of a model. For example, adding noise to the input of a model serves the same purpose as data augmentation, but will also work toward making the model robust to natural perturbations encountered with input data.

Additional types of data augmentation include random rotation, random scaling, random resizing, random shifting of an image, flipping an image, shading an image, adding random Gaussian noise to an image, changing a view of an image, randomly changing a contrast of an image, randomly changing a brightness of an image, randomly changing a color of an image, etc.

Different augmentations are important for different kinds of classification. Additionally, different augmentations should be avoided for different kinds of classification. Further, the degree of randomness is also critical for the classification task. Currently, classification types (and associated degrees of randomness) are randomly selected or decided by one or more users. This random selection may be improved upon by more dynamically analyzing an effect of augmentation on images or text to be classified.

In one embodiment, a deep reinforcement method may be implemented to leverage validation loss for assigning positive/negative rewards to learn optimal augmentation configurations. This implementation may analyze data-set distribution embedding similarities and may enable forking of virtual training instances in a cloud computing environment. This implementation may also perform validation on a sample set to choose the most effective configuration for applying on to the whole data set.

In one embodiment, given input training data, a system may create a small sample set (e.g., $\frac{1}{10}$ or $\frac{1}{100}$th of the total input training data set, etc.). The sample set may be passed through an augmentation prediction module, which predicts a top-K number of augmentations to apply.

Additionally, in one embodiment, different training instances may be created in the cloud for each predicted augmentation. In each training instance, the associated augmentation may be applied, and the sample set may be trained to capture a training and validation loss for the augmented data.

In another embodiment, once all the training instances are completed, the augmentation which had the least validation loss may be selected to augment all of the input training data.

Further, in one embodiment, the above process may be initialized with random augmentation predictions with a high number of training fork instances. Based on the calculated validation loss for each augmentation, a positive or negative reward may be assigned to the augmentation in the context of the input data.

Thus, using reinforcement learning, the system may learn which augmentation combinations result in the highest performance for a trained model, based on the data set. In response to another new data set, the new data set may be represented in the embedding space, and instead of randomly choosing the augmentations, highly rated augmentations based on similar trained data sets may be chosen for augmenting the new data set.

Creating Embedding Representations

Figure 7:
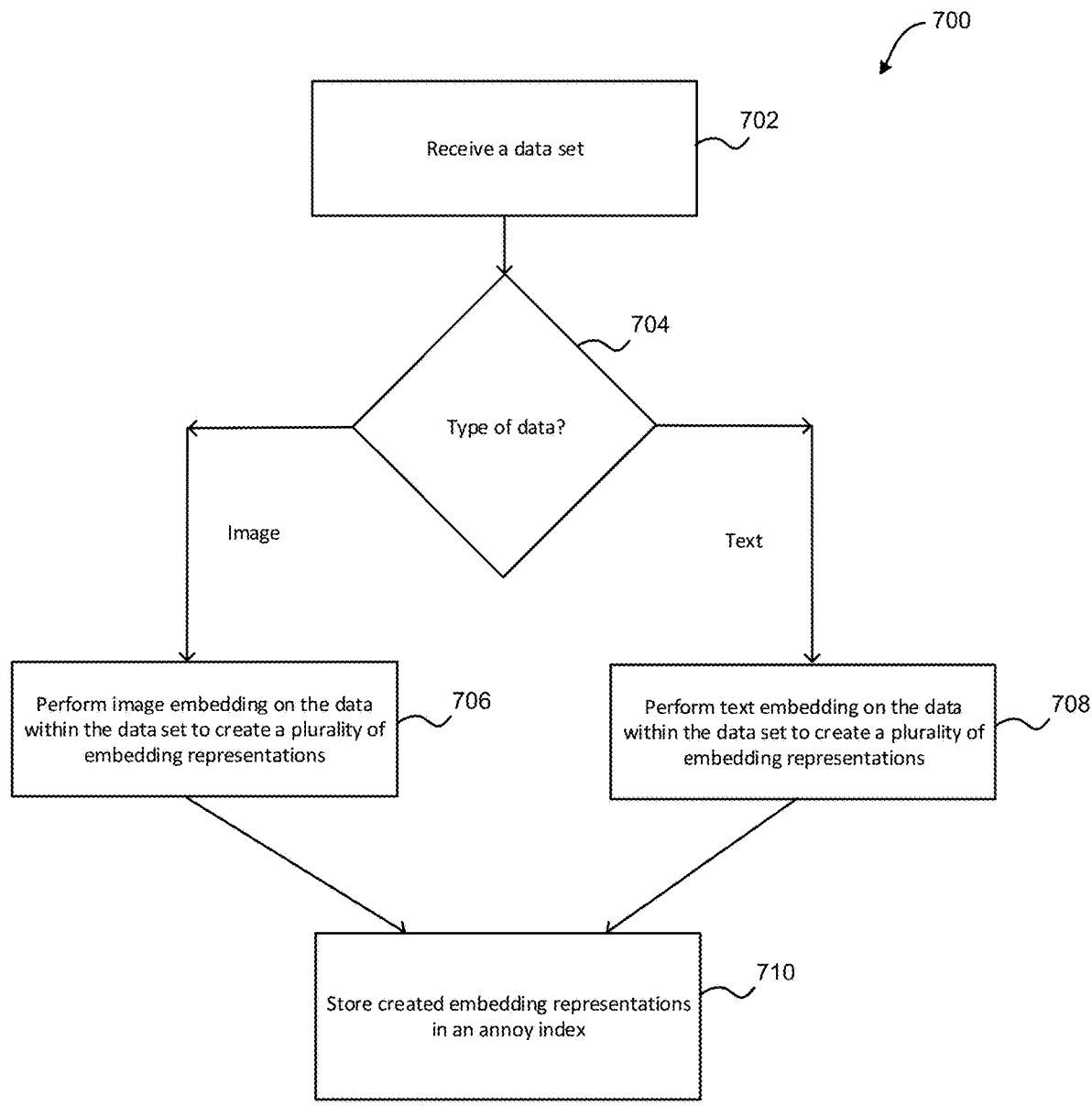
FIG. 7 illustrates a flowchart of a method for creating embedding representations, in accordance with one embodiment of the present invention.

Now referring to FIG. 7, a flowchart of a method 700 for creating embedding representations is shown according to one embodiment. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a data set is received. Additionally, method 700 may proceed with decision 704, where a type of data within the data set is determined. If it is determined in decision 704 that the data within the data set is image data, then method 700 may proceed with operation 706, where image embedding is performed on the data within the data set to create a plurality of embedding representations. For example, CNN embedding may be performed on the data within the data set.

Additionally, it is determined in decision 704 that the data within the data set is text data, then method 700 may proceed with operation 708, where text embedding is performed on the data within the data set to create a plurality of embedding representations. For example, BERT embedding may be performed on the data within the data set. Further, method 700 may proceed with operation 710, where created embedding representations are stored in an annoy index. In one embodiment, the annoy index may include a database for storing available embedding representations.

In this way, a database of stored embedding representations may be created for comparison to incoming data sets to determine one or more similar stored data sets.

Determining Data Set Similarity

Figure 8:
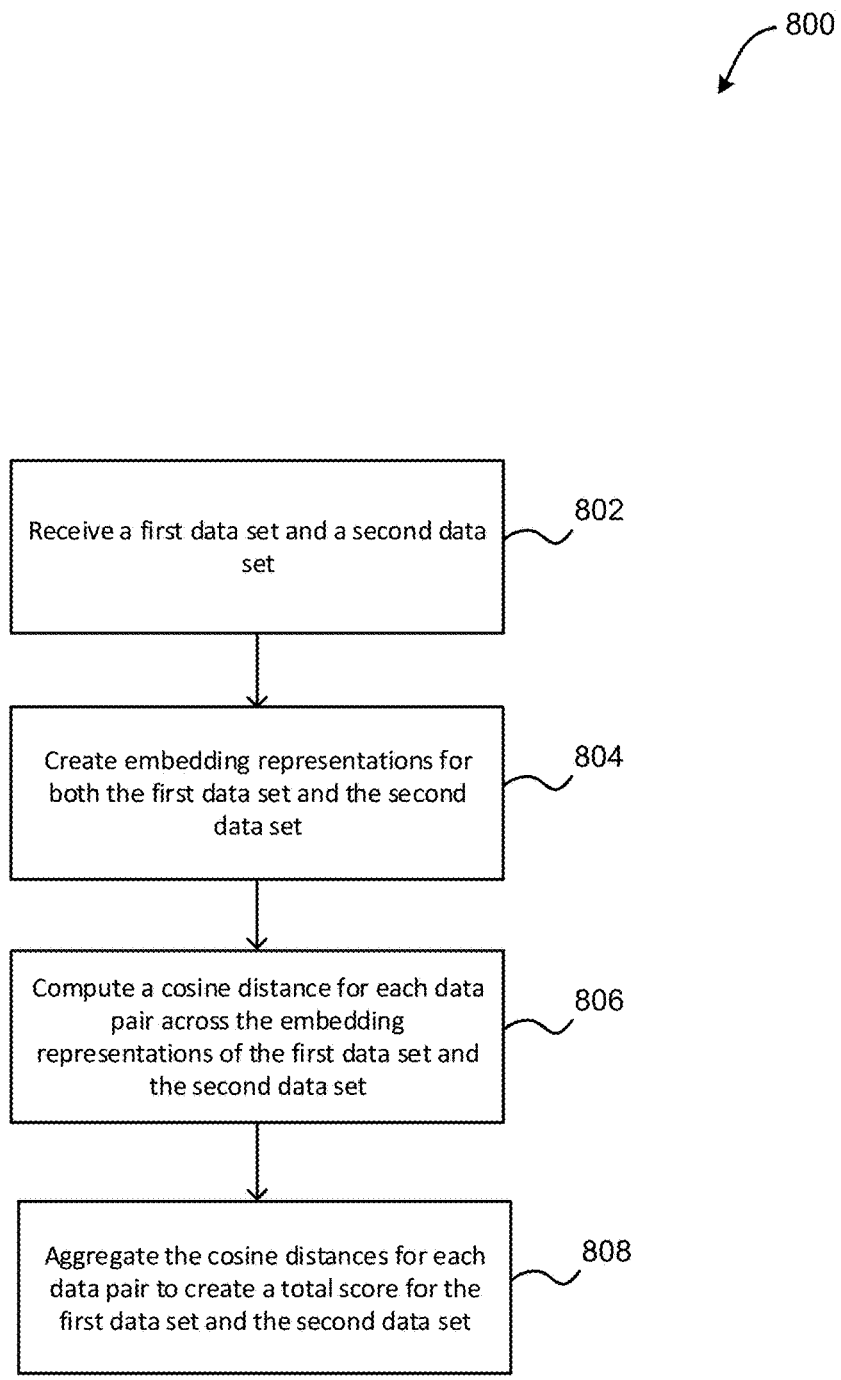
FIG. 8 illustrates a flowchart of a method for determining a similarity between data sets, in accordance with one embodiment of the present invention.

Now referring to FIG. 8, a flowchart of a method 800 for determining a similarity between data sets is shown according to one embodiment. The method 800 may be performed in accordance with the present invention in any of the environments depicted in FIGS. 1-4, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a first data set and a second data set are received. Additionally, method 800 may proceed with operation 804, where embedding representations are created for both the first data set and the second data set. For example, embedding representations may be created for each data set using the exemplary method detailed in FIG. 7.

Further, method 800 may proceed with operation 806, where a cosine distance is computed for each data pair across the embedding representations of the first data set and the second data set. Further still, method 800 may proceed with operation 808, where the cosine distances for each data pair are aggregated to create a total score for the first data set and the second data set. For example, a lower score for two data sets indicates a higher similarity between the data sets.

In this way, a level of similarity between the first data set and the second data set may be determined.

Reward-Based Augmentation Fine Tuning

Figure 9:
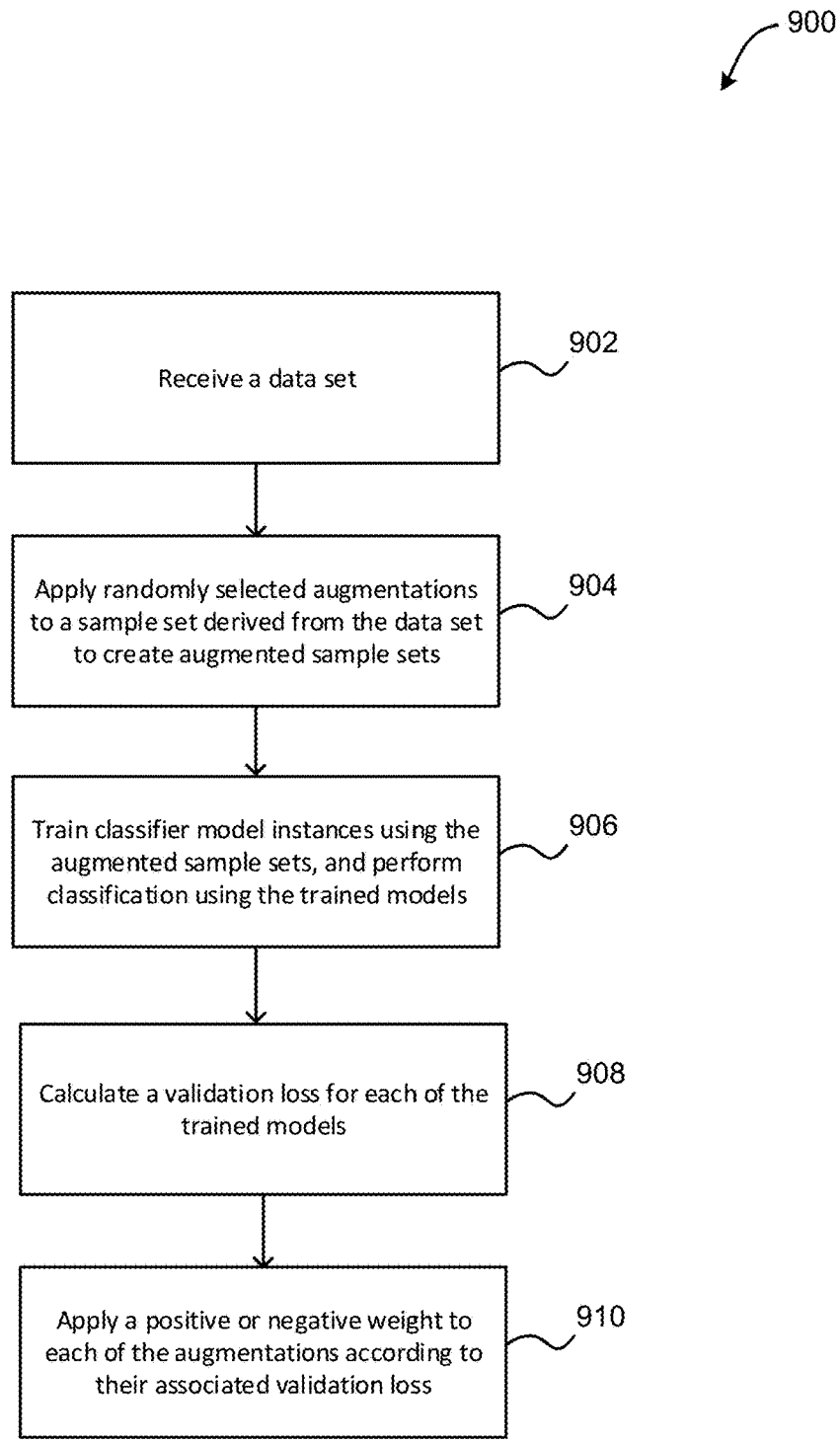
FIG. 9 illustrates a flowchart of a method for adjusting a weighting of augmentations, in accordance with one embodiment of the present invention.

Now referring to FIG. 9, a flowchart of a method 900 for adjusting a weighting of augmentations is shown according to one embodiment. The method 900 may be performed in accordance with the present invention in any of the environments depicted in FIGS. 1-4, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where a data set is received. Additionally, method 900 may proceed with operation 904, where randomly selected augmentations are applied to a sample set derived from the data set to create augmented sample sets. Further, method 900 may proceed with operation 906, where classifier model instances are trained using the augmented sample sets, and classification is performed using the trained models.

Further still, method 900 may proceed with operation 908, where a validation loss is calculated for each of the trained models. Also, method 900 may proceed with operation 910, where a positive or negative weight is applied to each of the augmentations according to their associated validation loss. For example, a first augmentation that results in a trained model with a lower validation loss may be assigned a greater weight than a second augmentation that results in a trained model with a higher validation loss.

In this way, augmentations may be weighted according to their model training effectiveness for a particular data set.

Training Instance Forking

Figure 10:
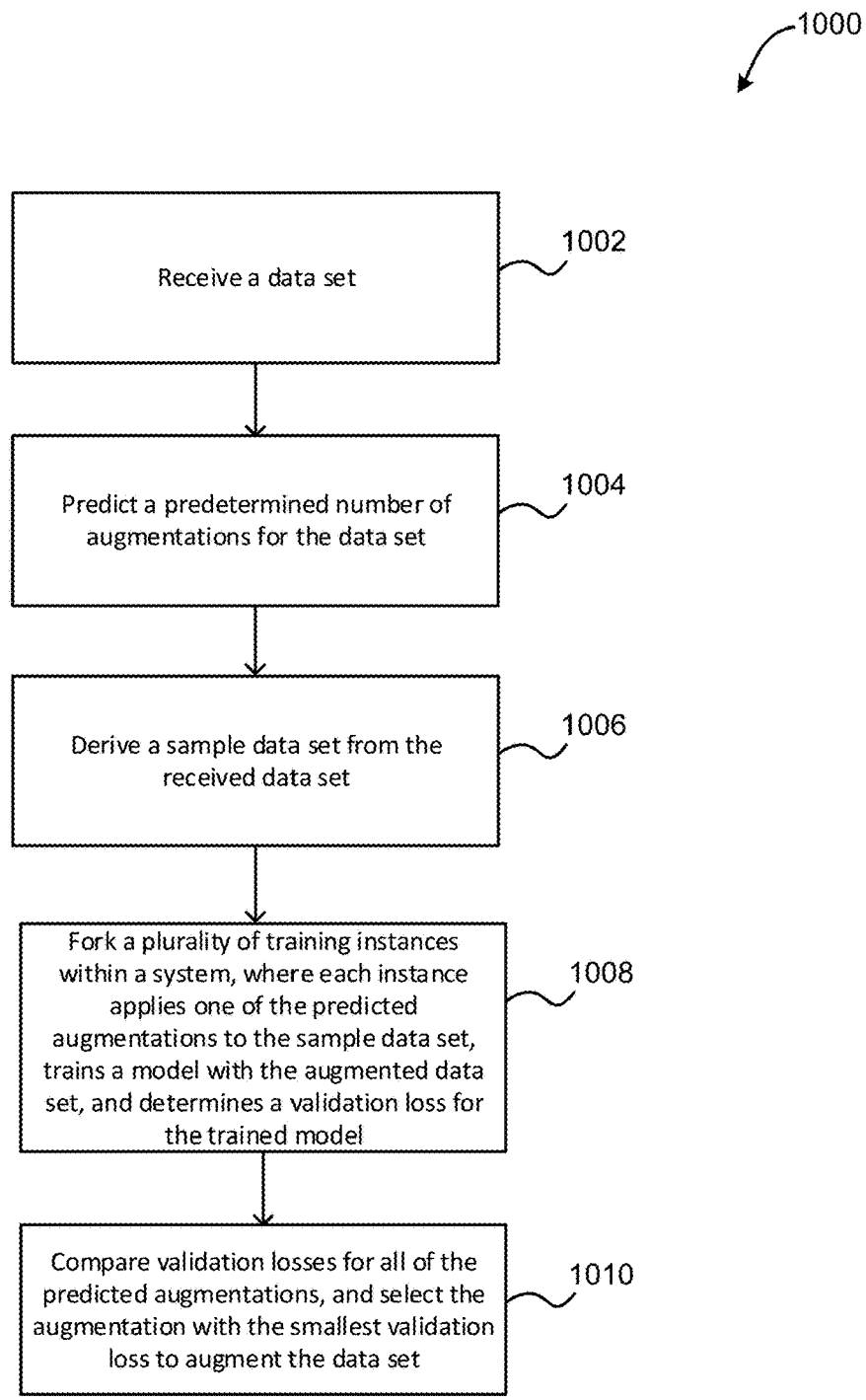
FIG. 10 illustrates a flowchart of a method for performing training instance forking, in accordance with one embodiment of the present invention.

Now referring to FIG. 10, a flowchart of a method 1000 for performing training instance forking is shown according to one embodiment. The method 1000 may be performed in accordance with the present invention in any of the environments depicted in FIGS. 1-4, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 may initiate with operation 1002, where a data set is received. Additionally, method 1000 may proceed with operation 1004, where a predetermined number of augmentations are predicted for the data set. In one embodiment, the augmentations may be predicted in response to identifying a similarity between the received data set and a preexisting data set, and retrieving weights associated with augmentations for the preexisting data set. For instance, the augmentations may be arranged according to weight, and a predetermined number of augmentations may be selected, starting with the highest rated augmentation.

Further, method 1000 may proceed with operation 1006, where a sample data set is derived from the received data set. Further still, method 1000 may proceed with operation 1008, where a plurality of training instances is forked within a system, where each instance applies one of the predicted augmentations to the sample data set, trains a model with the augmented data set, and determines a validation loss for the trained model. Also, method 1000 may proceed with operation 1010, where validation losses for all of the predicted augmentations are compared, and the augmentation with the smallest validation loss is selected to augment the data set.

In this way, forking may be used to apply augmentations in parallel, utilizing a distributed system such as a cloud computing environment.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a training data set to be applied to a model;
selecting a subset of the training data set as a sample set;
for each of a plurality of predetermined augmentations:
  applying the predetermined augmentation to the sample set to create an augmented sample set,
  training the model with the augmented sample set,
  determining a performance of the trained model, and
  assigning a weight to the predetermined augmentation for the training data set, based on the determined performance; and
selecting one or more of the plurality of predetermined augmentations to be applied to the training data set before the training data set is applied to the model, based on the weight assigned to each of the plurality of predetermined augmentations.

2. The computer-implemented method of claim 1, further comprising:
receiving a current training data set to be applied to the model;
identifying characteristics of the current training data set;
comparing the characteristics of the current training data set to characteristics of each of a plurality of preexisting training data sets;
determining one of the plurality of preexisting training data sets having a highest similarity to the current training data set, based on the comparing;
identifying weights assigned to each of a plurality of predetermined augmentations for the determined preexisting training data set having the highest similarity to the training data set; and
selecting one or more of the plurality of predetermined augmentations for the determined preexisting training data set to be applied to the current training data set before the current training data set is applied to the model, based on the weights.

3. The computer-implemented method of claim 1, wherein the model includes a neural network.

4. The computer-implemented method of claim 1, wherein selecting the subset of the training data set includes identifying a predetermined percentage of the training data set as the sample set.

5. The computer-implemented method of claim 1, wherein each of the plurality of predetermined augmentations includes a process that changes one or more aspects of each data instance within the training data set to create an augmented data set.

6. The computer-implemented method of claim 1, wherein for each of the predetermined augmentations, the augmented sample set is input to the model as training data.

7. The computer-implemented method of claim 1, wherein for each of the predetermined augmentations, the weight assigned to the predetermined augmentation is determined based on a comparison of a first output of the model trained with the augmented sample set to a second output of another instance of the model trained with a non-augmented sample set.

8. The computer-implemented method of claim 1, wherein, for each of a plurality of predetermined augmentations, the weight for the predetermined augmentation is assigned to a grouping of the predetermined augmentation, the training data set, and the model.

9. The computer-implemented method of claim 1, wherein the plurality of predetermined augmentations are ranked based on their associated weights, and a predetermined number of augmentations having the highest weights are selected to be applied to the training data set to create an augmented training data set.

10. The computer-implemented method of claim 9, wherein the augmented training data set may be input into the model to train the model to perform one or more operations.

11. The computer-implemented method of claim 1, further comprising implementing a deep reinforcement method that leverages validation loss to assign positive and negative rewards to the plurality of predetermined augmentations to learn optimal augmentation configurations for the model.

12. The computer-implemented method of claim 1, wherein the plurality of predetermined augmentations is applied to the sample set by automatically forking a large varied set of virtual training instances in a cloud environment to validate which of the plurality of predetermined augmentations has a highest performance for the sample set.

13. A computer program product for determining optimal augmentations for a training data set, the computer program product comprising a computer readable storage medium having program instructions embodied therewith, wherein the computer readable storage medium is not a transitory signal per se, the program instructions executable by a processor to cause the processor to perform a method comprising:
receiving, by the processor, a training data set to be applied to a model;
selecting, by the processor, a subset of the training data set as a sample set;
for each of a plurality of predetermined augmentations:
applying, by the processor, the predetermined augmentation to the sample set to create an augmented sample set,
training, by the processor, the model with the augmented sample set,
determining, by the processor, a performance of the trained model, and
assigning, by the processor, a weight to the predetermined augmentation for the training data set, based on the determined performance; and
selecting, by the processor, one or more of the plurality of predetermined augmentations to be applied to the training data set before the training data set is applied to the model, based on the weight assigned to each of the plurality of predetermined augmentations.

14. The computer program product of claim 13, further comprising:
receiving, by the processor, a current training data set to be applied to the model;
identifying, by the processor, characteristics of the current training data set;
comparing, by the processor, the characteristics of the current training data set to characteristics of each of a plurality of preexisting training data sets;
determining, by the processor, one of the plurality of preexisting training data sets having a highest similarity to the current training data set, based on the comparing;
identifying, by the processor, weights assigned to each of a plurality of predetermined augmentations for the determined preexisting training data set having the highest similarity to the training data set; and
selecting, by the processor, one or more of the plurality of predetermined augmentations for the determined preexisting training data set to be applied to the current training data set before the current training data set is applied to the model, based on the weights.

15. The computer program product of claim 13, wherein the model includes a neural network.

16. The computer program product of claim 13, wherein selecting the subset of the training data set includes identifying a predetermined percentage of the training data set as the sample set.

17. The computer program product of claim 13, wherein each of the plurality of predetermined augmentations includes a process that changes one or more aspects of each data instance within the training data set to create an augmented data set.

18. The computer program product of claim 13, wherein for each of the predetermined augmentations, the augmented sample set is input to the model as training data.

19. The computer program product of claim 13, wherein for each of the predetermined augmentations, the weight assigned to the predetermined augmentation is determined based on a comparison of a first output of the model trained with the augmented sample set to a second output of another instance of the model trained with a non-augmented sample set.

20. A system, comprising:
a processor; and
logic integrated with the processor, executable by the processor, or integrated with and executable by the processor, the logic being configured to:
receive a training data set to be applied to a model;
select a subset of the training data set as a sample set;
for each of a plurality of predetermined augmentations:
apply the predetermined augmentation to the sample set to create an augmented sample set,
train the model with the augmented sample set,
determine a performance of the trained model, and
assign a weight to the predetermined augmentation for the training data set, based on the determined performance; and
select one or more of the plurality of predetermined augmentations to be applied to the training data set before the training data set is applied to the model, based on the weight assigned to each of the plurality of predetermined augmentations.

* * * * *